US011720199B2

(12) United States Patent
Adams

(10) Patent No.: US 11,720,199 B2
(45) Date of Patent: *Aug. 8, 2023

(54) SELF-CAPACITANCE DEVICE FOR OBJECT RECOGNITION ON CAPACITANCE TOUCHSCREEN

(71) Applicant: iSO-FORM LLC, Ames, IA (US)

(72) Inventor: Russell W. Adams, Ankeny, IA (US)

(73) Assignee: iSO-FORM LLC, Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/740,025

(22) Filed: May 9, 2022

(65) Prior Publication Data

US 2022/0269368 A1 Aug. 25, 2022

Related U.S. Application Data

(63) Continuation of application No. 16/747,024, filed on Jan. 20, 2020, now Pat. No. 11,327,596.

(60) Provisional application No. 62/796,322, filed on Jan. 24, 2019.

(51) Int. Cl.
*G06F 3/041* (2006.01)
*G06F 3/044* (2006.01)

(52) U.S. Cl.
CPC .......... *G06F 3/0416* (2013.01); *G06F 3/0412* (2013.01); *G06F 3/0448* (2019.05)

(58) Field of Classification Search
CPC .... G06F 3/0448; G06F 3/0416; G06F 3/0412; G06F 3/0393; A63F 2009/241; A63F 2003/00662; A63F 2009/2458; A63F 2009/2442; A63F 3/00643; A63F 13/00
See application file for complete search history.

(56) References Cited

U.S. PATENT DOCUMENTS

| | | | |
|---|---|---|---|
| 8,773,405 B1 * | 7/2014 | Ryshtun | G06F 1/3206 178/19.03 |
| 9,134,830 B1 * | 9/2015 | Lee | G01G 9/00 |
| 2016/0224086 A1 * | 8/2016 | Kim | G06F 3/03545 |
| 2016/0320918 A1 * | 11/2016 | Hara | G06F 3/0442 |
| 2019/0064993 A1 * | 2/2019 | Hardie-Bick | G06F 3/04883 |
| 2020/0089340 A1 * | 3/2020 | Ruscher | G06F 3/044 |

* cited by examiner

*Primary Examiner* — Muhammad N Edun
(74) *Attorney, Agent, or Firm* — Dentons Davis Brown; Matthew Warner-Blankenship

(57) ABSTRACT

Disclosed herein are various embodiments of a self-capacitance device that is configured to be detectable by a known touchscreen without the need for human contact. Such a device has a device body, a capacitance structure disposed within the body, and at least three contacts disposed on one side of the body and electrically coupled to the capacitance structure. Further disclosed herein are systems having at least two such self-capacitance devices and a software application configured to recognize each of the at least two self-capacitance devices.

20 Claims, 6 Drawing Sheets

SELF-CAPACITANCE DEVICE FOR OBJECT RECOGNITION ON CAPACITANCE TOUCHSCREEN

CROSS-REFERENCE TO RELATED APPLICATION(S)

This application is a continuation of U.S. application Ser. No. 16/747,024, filed Jan. 20, 2020, issued May 10, 2022 as U.S. Pat. No. 11,327,596, which claims priority to U.S. Provisional Application No. 62/796,322, filed Jan. 24, 2019 and entitled "Self-Capacitance Device for Object Recognition on Capacitance Touchscreen," which is hereby incorporated herein by reference in its entirety under 35 U.S.C. § 119(e).

FIELD

The various embodiments herein relate to self-capacitance devices that can be detected by a known computer touchscreen and related systems that allow for such devices to interact with such touchscreens for purposes of various computer games and the like.

BACKGROUND

Known projected capacitive touchscreens require contact from a portion of a human body. That is, the known touchscreens register contact on the touchscreen by recognizing the capacitance of the portion of the human body in contact with the surface as well as the surface area of the body portion touching the screen.

As a result of this capacitance requirement, known touchscreens generally cannot detect contact from objects other than human skin. One known solution to this problem is to use a conductive object to pass the capacitance of the hand of the user holding the object through the object and to the touchscreen. One disadvantage of this approach is that the user must maintain constant contact with the object with a bare hand in order for the capacitance to be transferred through the object and thus for the touchscreen to detect the object. As soon as the user releases the object or otherwise breaks contact with the object, the touchscreen can no longer detect the presence of the object.

There is a need in the art for an improved device that can be detected by a touchscreen even if a user is not touching the device.

BRIEF SUMMARY

Discussed herein are various self-capacitance devices for use with a known touchscreen and various systems including at least one self-capacitance device and software that can interact with the device. Some device embodiments have a capacitance structure and at least three contacts electrically coupled to the capacitance structure.

In Example 1, a self-capacitance device comprises a body, a capacitance coil disposed within the body, and at least three contacts disposed on a distal side of the body, wherein the at least three are in electrical contact with the capacitance coil.

Example 2 relates to the self-capacitance device according to Example 1, further comprising at least one weight disposed within the body.

Example 3 relates to the self-capacitance device according to Example 1, wherein the body comprises an internal wall disposed within the body, an external wall defining an outer surface of the body, a first space defined within the internal wall, and a second space defined between the internal wall and the external wall.

Example 4 relates to the self-capacitance device according to Example 3, wherein at least one weight is positionable within the first space and the capacitance coil is disposed within the second space.

Example 5 relates to the self-capacitance device according to Example 1, further comprising an object disposed on a proximal side of the body.

Example 6 relates to the self-capacitance device according to Example 1, further comprising a removable cover removably disposable on a proximal side of the body.

Example 7 relates to the self-capacitance device according to Example 6, further comprising an object disposed on the removable cover.

Example 8 relates to the self-capacitance device according to Example 7, wherein the object comprises an enclosure attached to the removable cover, and a three-dimensional object disposed within the enclosure.

Example 9 relates to the self-capacitance device according to Example 1, further comprising an opening defined in a proximal side of the body, a cover removably coupleable with the body at the opening, and a weight disposed within a first space within the body, wherein the capacitance coil is disposed within a second space within the body.

In Example 10, an object identification system for use with a touchscreen device comprises at least two self-capacitance devices, wherein each self-capacitance device comprises a body, a capacitance coil disposed within the body, and at least three contacts disposed in a predetermined pattern on a distal side of the body such that the predetermined pattern is unique to the self-capacitance device, wherein the at least three are in electrical contact with the capacitance coil. Further, the system also comprises a software application configured to recognize each predetermined pattern of the at least three contacts on each of the at least two self-capacitance devices.

Example 11 relates to the object identification system according to Example 10, wherein the software application is stored on a transportable memory device.

Example 12 relates to the object identification system according to Example 11, wherein the system further comprises retail system packaging, wherein the at least two self-capacitance devices and the transportable memory device are disposed within the retail system packaging.

Example 13 relates to the object identification system according to Example 10, wherein the system further comprises retail system packaging, wherein the retail system packaging comprises the at least two self-capacitance devices and instructions for downloading the software application.

Example 14 relates to the object identification system according to Example 10, wherein the body comprises at least one weight is disposable within the body.

Example 15 relates to the object identification system according to Example 10, further comprising an object disposed on a proximal side of the body.

Example 16 relates to the object identification system according to Example 10, further comprising a removable cover removably disposable on a proximal side of the body.

Example 17 relates to the object identification system according to Example 16, further comprising an object disposed on the removable cover.

Example 18 relates to the object identification system according to Example 17, wherein the object comprises an enclosure attached to the removable cover, and a three-dimensional object disposed within the enclosure.

In Example 19, a self-capacitance device comprises a device body, an object disposed on a first side of the body, a capacitance structure disposed within the body, and at least three contacts disposed on a second side of the body, wherein the at least three contacts are in electrical contact with the capacitance structure.

Example 20 relates to the self-capacitance device according to Example 19, wherein the object comprises an enclosure attached to the first side of the body, and a three-dimensional object disposed within the enclosure.

In Example 21, an object identification system comprises a touchscreen device, at least two self-capacitance devices, wherein each self-capacitance device comprises a body, a capacitance coil disposed within the body, and at least three contacts disposed in a predetermined pattern on a distal side of the body such that the predetermined pattern is unique to the self-capacitance device, wherein the at least three are in electrical contact with the capacitance coil. Further, the system also comprises a software application operably storable within the touchscreen device, wherein the software application is configured to recognize each predetermined pattern of the at least three contacts on each of the at least two self-capacitance devices.

While multiple embodiments are disclosed, still other embodiments will become apparent to those skilled in the art from the following detailed description, which shows and describes illustrative embodiments. As will be realized, the various implementations are capable of modifications in various obvious aspects, all without departing from the spirit and scope thereof. Accordingly, the drawings and detailed description are to be regarded as illustrative in nature and not restrictive.

DETAILED DESCRIPTION

The various embodiments disclosed or contemplated herein relate to self-capacitance devices that can be detected by a known touchscreen without the need for human contact. Further, in certain implementations, certain systems are provided having two or more such self-capacitance devices and accompanying software that can utilize the detection capabilities to distinguish between the two or more devices. Each such self-capacitance device can replicate the capacitance and surface area of a human finger. As such, in the system embodiments, the software can utilize the distance and angles between the contact points of any specific self-capacitance device (of the two or more devices) in contact with a touchscreen to distinguish between and recognize the separate self-capacitance devices placed thereon, along with the position and orientation of the devices. That is, unlike known devices that require conductivity and a user touching the known device at all times such that capacitance passes from the user through the known device, certain device embodiments as contemplated herein can simulate the presence of a human finger on a touchscreen using self-capacitance without requiring an external capacitance source.

Figure 1:
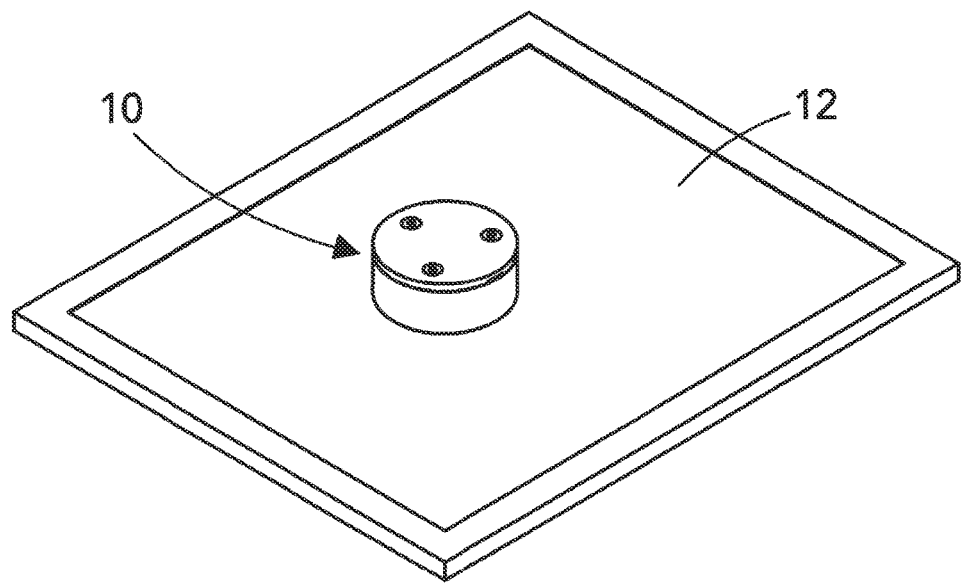
FIG. 1 is a perspective view of a self-capacitance device disposed on a touchscreen, according to one embodiment.
Figure 2A:
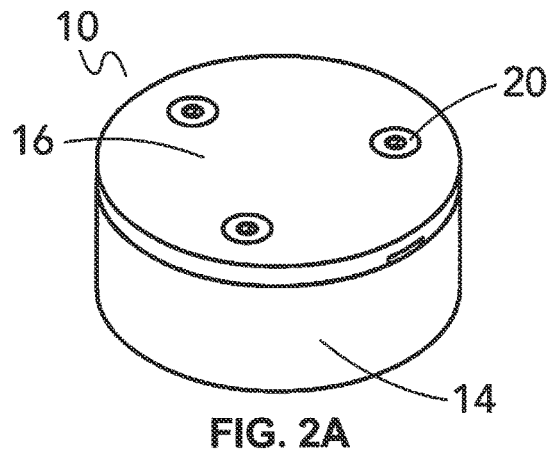
FIG. 2A is an expanded perspective view of the self-capacitance device of FIG. 1, according to one embodiment.
Figure 2B:
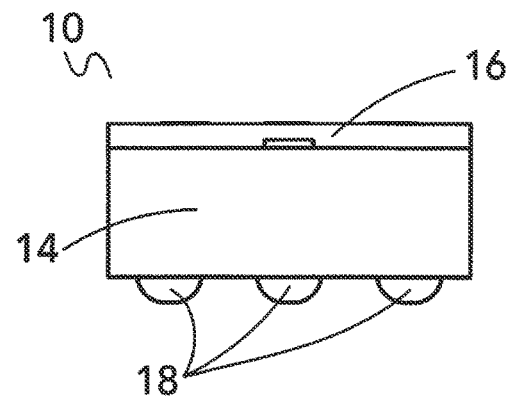
FIG. 2B is a side view of the self-capacitance device of FIG. 1, according to one embodiment.
Figure 2C:
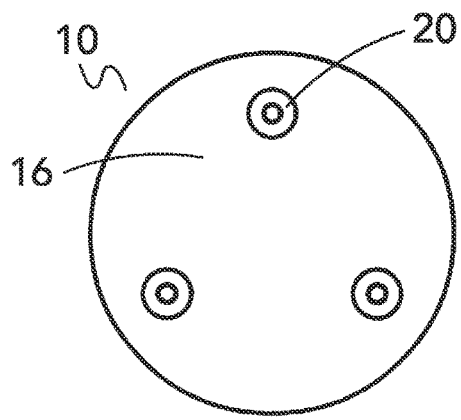
FIG. 2C is a top view of the self-capacitance device of FIG. 1, according to one embodiment.
Figure 2D:
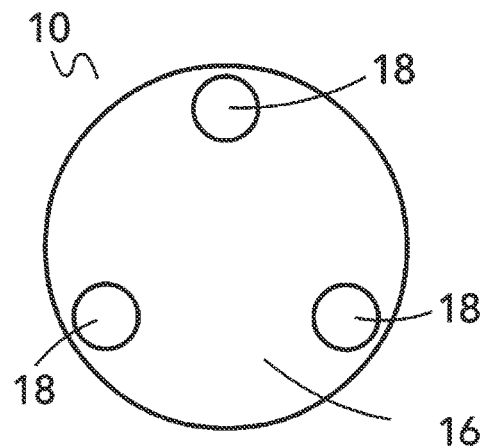
FIG. 2D is a bottom view of the self-capacitance device of FIG. 1, according to one embodiment.
Figure 3A:
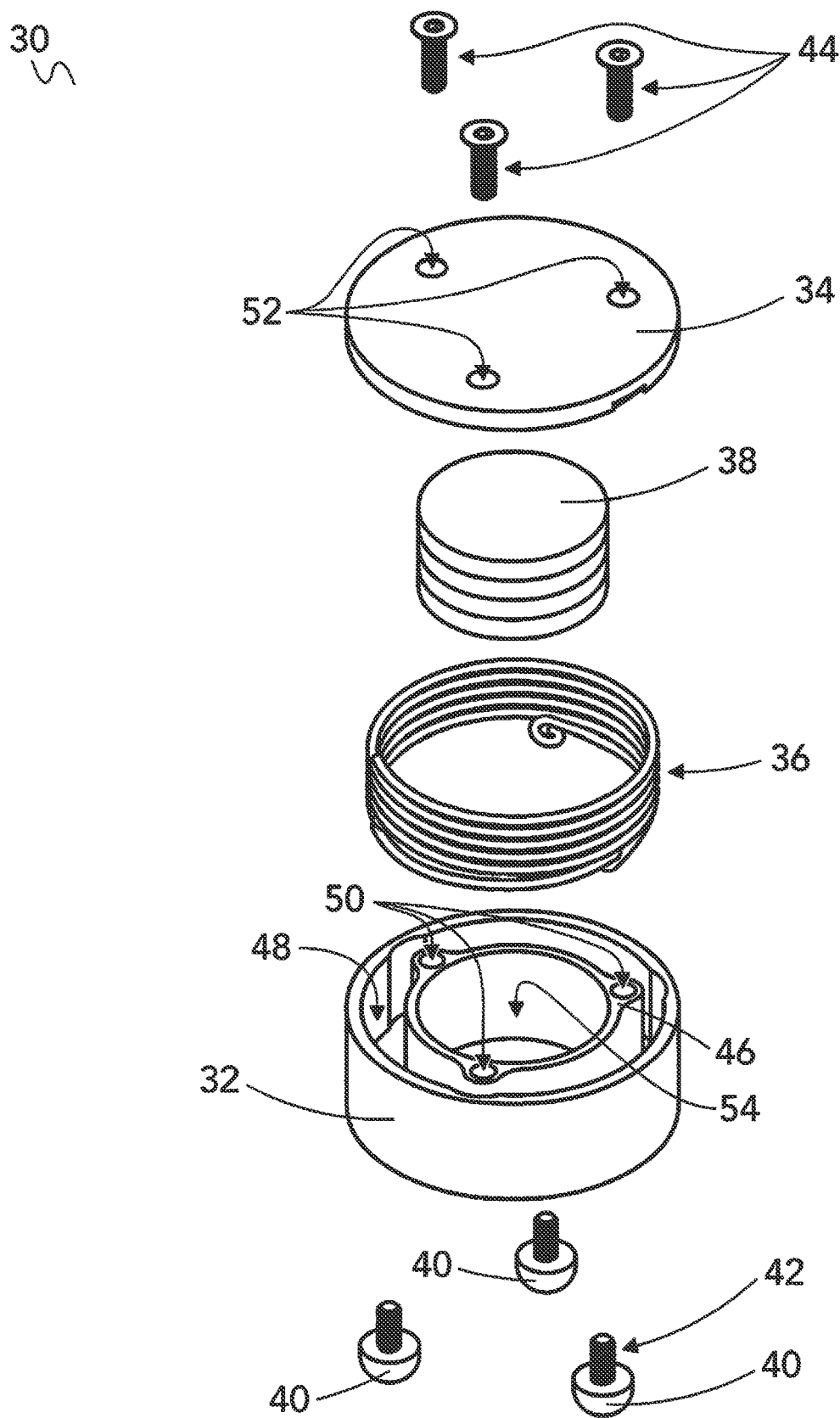
FIG. 3A is an exploded perspective view of a self-capacitance device, according to another embodiment.
Figure 3B:
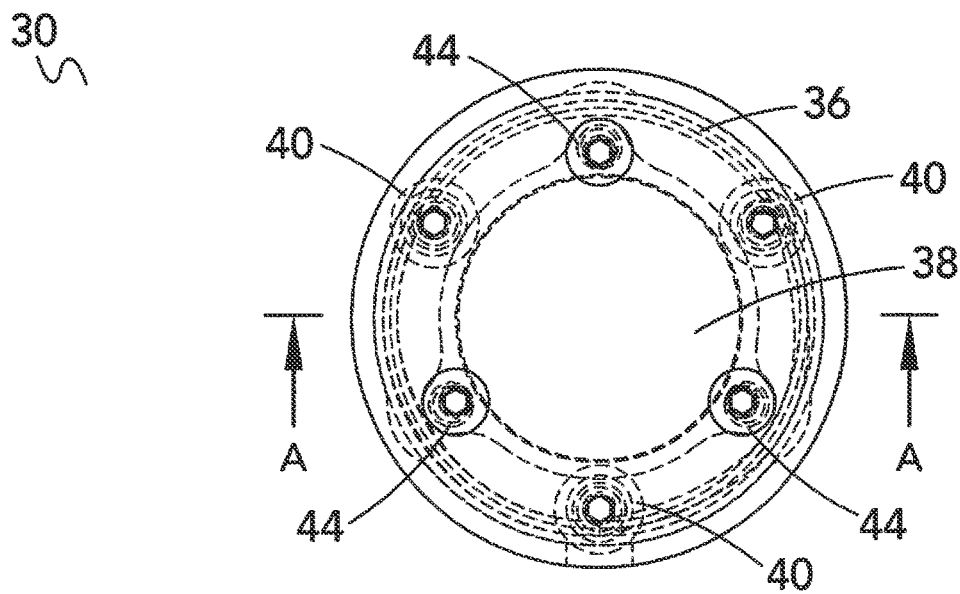
FIG. 3B is a top view of the self-capacitance device of FIG. 3A, according to one embodiment.
Figure 3C:
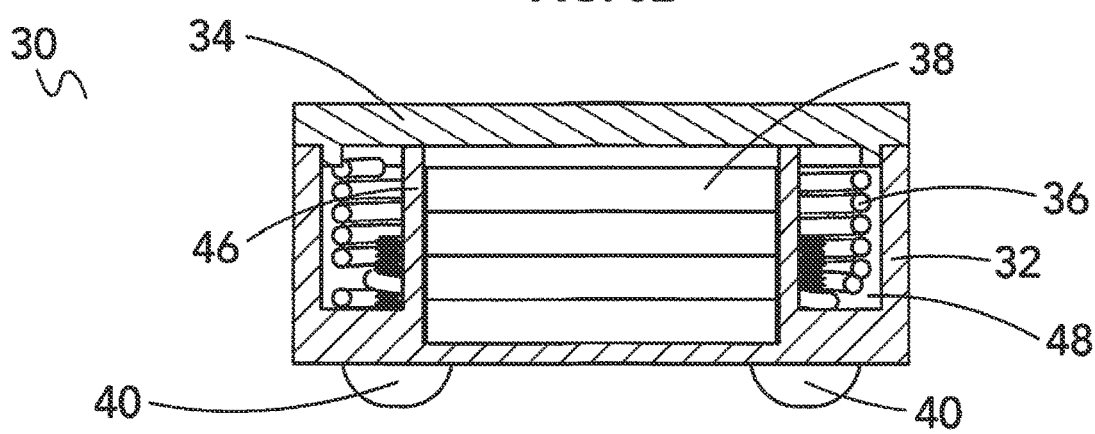
FIG. 3C is a cross-sectional side view of the self-capacitance device of FIG. 3A, according to one embodiment.
Figure 3D:
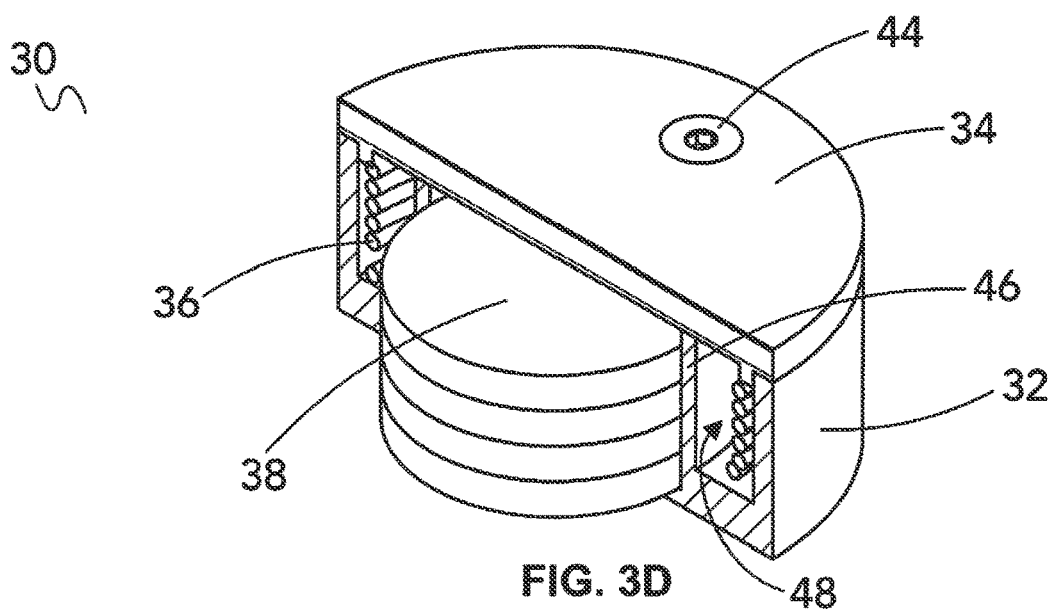
FIG. 3D is a cross-sectional perspective view of the self-capacitance device of FIG. 3A, according to one embodiment.
Figure 4A:
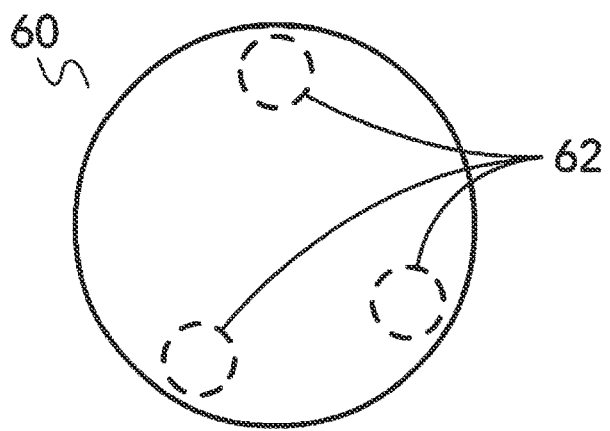
FIG. 4A is a top view of a self-capacitance device with conductive contacts disposed in a specific arrangement on the device, according to one embodiment.
Figure 4B:
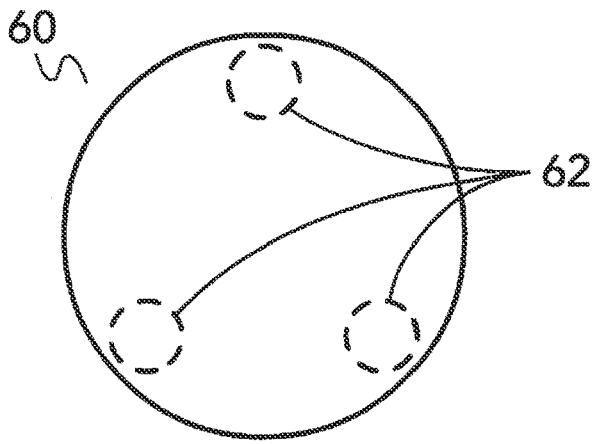
FIG. 4B is a top view of a self-capacitance device with conductive contacts disposed in another specific arrangement on the device, according to a further embodiment.
Figure 4C:
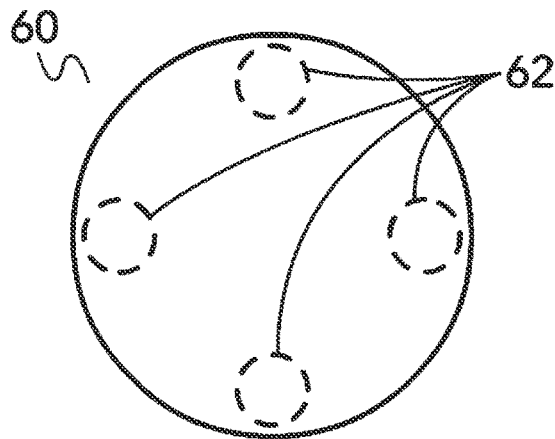
FIG. 4C is a top view of a self-capacitance device with conductive contacts disposed in a further specific arrangement on the device, according to another embodiment.
Figure 4D:
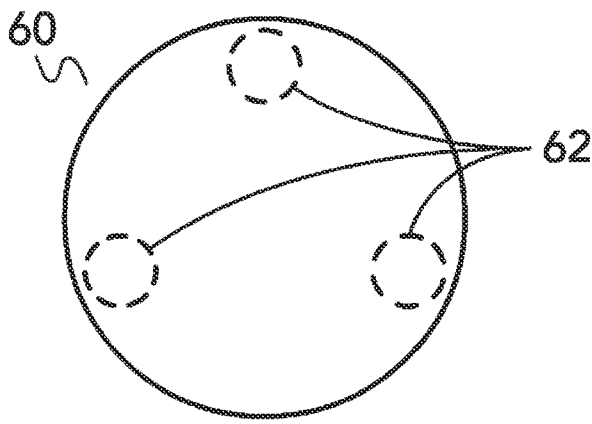
FIG. 4D is a top view of a self-capacitance device with conductive contacts disposed in yet another specific arrangement on the device, according to yet another embodiment.
Figure 4E:
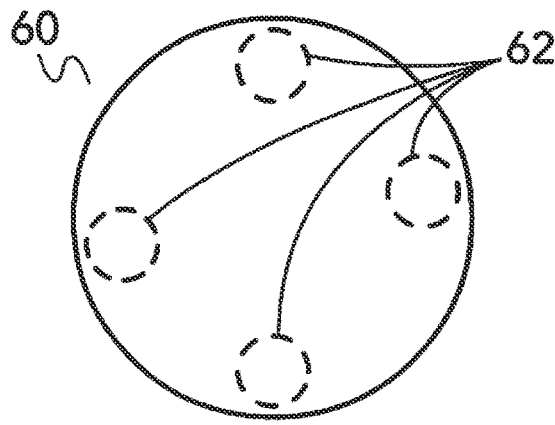
FIG. 4E is a top view of a self-capacitance device with conductive contacts disposed in another specific arrangement on the device, according to a further embodiment.

A self-capacitance device 10 disposed on a known touchscreen 12 is depicted in FIG. 1, according to one embodiment. The device 10 is depicted in further detail in FIGS. 2A through 2D. The device 10 has a device body 14, a top (or proximal) cover 16, three contacts 18 disposed at the bottom (or distal end) of the body 14, and three attachment mechanisms 20 that couple the top cover 16 to the body 14. It is understood that the body 14 contains a self-capacitance coil or other self-capacitance structure (not shown), as will be described in additional detail below with respect to other embodiments.

The device body 14 in this embodiment is generally cylindrical as shown. Alternatively, the device body 14 can be generally rectangular, generally square, or any other known shape, so long as the body 14 has the same components and features as described herein.

According to the exemplary embodiment as shown, the top cover 16 is removably attached to the top of the body 14 with the three attachment mechanisms 20 as depicted. Alternatively, the cover 16 can be disposed on the bottom side of the body 14. In a further alternative, the removable cover 16 can be disposed on a side of the body 14. In each such implementation, the cover 16 is configured to be removable such that the self-capacitance coil (not shown) can be positioned within and/or removed from the body 14. In yet another alternative embodiment, the body 14 has no cover.

The three attachment mechanisms 20 as shown in this particular implementation are three screws 20. Alternatively, the attachment mechanisms 20 can be any known attachment mechanisms, such as bolts, clamps, rivets, or any other such known mechanisms for removably coupling the top cover 16 to the body 14. In a further alternative, it is understood that the number of attachment mechanisms is not limited to three. Instead, the device 10 can have one, two, four, five, six, or any number of attachment mechanisms.

The three contacts 18, according to one embodiment, are conductive button or knob-shaped contacts 18 that are disposed on the bottom surface of body 14 such that the contacts 18 are in contact with a surface of a touchscreen (not shown) when the device 10 is placed thereon. The contacts 18 in this implementation are curved or convex. Alternatively, the tips or contact surfaces of the contacts 18 can be flat or any other known shape for a contact. In one embodiment, the contacts 18 can be made of any conductive material. For example, the contacts 18 can be made of conductive rubber, conductive foam, conductive plastic, or any other known conductive material that can be used as a contact in this type of device. It is understood that the device 10 is not limited to having three contacts 18. Rather, the device 10 can have one, two, four, five, six, or any number of contacts 18 disposed on the bottom surface of the body 14.

It is understood that the various characteristics and features and alternative embodiments of the body 14, top cover 16, attachment mechanisms 20, and the contacts 18 can also be incorporated into any other device or system embodiment disclosed or contemplated herein.

Another implementation of a self-capacitance device 30 is depicted in FIGS. 3A-3D. The device 30 has a device body 32, a top (or proximal) cover 34, a self-capacitance structure 36 that can be disposed within the body 32, at least one weight 38 also disposed within the body 32, three contacts 40 disposed at the bottom (or distal end) of the body 32, and three attachment mechanisms 44 that couple the top cover 34 to the body 32. It is understood that various components and features of this device 30 are substantially similar to the corresponding components and features of the previous device 10 embodiment and thus will not be discussed herein. Instead, only the components/features that are different or new will be discussed in detail below. Further, it is understood that the new and/or different components/features can also be incorporated into any other embodiment disclosed or contemplated herein.

In one embodiment, the body 32 and cover 34 (and any other body or cover embodiments herein) can be made of any suitably hard material. For example, the body 32 and cover 34 can be made of a suitably hard plastic, metal (such as, for example aluminum), or wood. Further, the body 32 and cover 34 can be formed via any known process, including, for example, 3D printing or machining. In this specific embodiment, the self-capacitance structure 36 consists of a length of solid insulated 22 AWG wire formed into a coil. In other embodiments, the self-capacitance structure 36 could consist of any gauge and type of known conductive wire that will fit the space 48. The weight 38 used in this exemplary implementation consists of tungsten carbide, however any suitably heavy material could be used. For example, the weight 38 could consist of steel or lead or any other such known material. Alternatively, the body 32 (or any body embodiment herein) can contain no weight therein.

The device body 32 has an external wall 32 and an internal wall 46 defining a space 48 therebetween. The space 48 can be sized and shaped to receive the self-capacitance coil 36 as shown. Further, the internal wall 46 defines an opening or space 54 within the wall 46 that is sized and shaped to receive the at least one weight 38. In addition, in this implementation, the internal wall 46 has three openings 50 defined therein that are configured to attachably receive the attachment mechanisms 44.

It is understood that the three attachment mechanisms 44 are substantially similar to the attachment mechanisms 20 discussed above and that the discussion regarding those mechanisms 20, and all features and variations thereof, apply equally to this embodiment. In this embodiment, the attachment mechanisms 44 extend through the openings 52 in the top cover 34 and into the openings 50 defined in the inner wall 46, as mentioned above. Thus, the mechanisms 44 can be used to removably couple the cover 34 to the body 32.

It is understood that that the three contacts 40 are substantially similar to the contacts 18 discussed above and that the discussion regarding those contacts 18, and all features and variations thereof, apply equally to this embodiment. In this embodiment, the contacts 40 have attachment and connection mechanisms 42 attached thereto that provide for attachment of the contacts 40 to the body 32 and also provide for electrical connection to the self-capacitance structure 36. That is, the attachment and connection mechanisms 42 can be threaded screws or any other known attachment mechanisms that extend through openings (not shown) defined in the bottom portion of the body 32 and into the coil space 48 such that the mechanisms 42 are in contact with the self-capacitance structure 36 disposed therein, thereby establishing an electrical connection between the structure 36 and the contacts 40.

The at least one weight 38 is disposed within the weight space 54 and intended to improve the electrical contact between the contacts 40 and the known touchscreen which the contacts 40 are in contact with. That is, the at least one weight 38 urges the contacts 40 against the touchscreen (not shown) with greater force than if the device 30 did not have the at least one weight 38. The at least one weight 38 in this specific example is four circular or cylindrical weights 38 in a stacked configuration as shown. Alternatively, the at least one weight 38 can be one, two, three, five, six, or any number of weights 38 that are disposed or are can be disposed within the weight space 54. In one exemplary implementation, the use of two or more weights 38 provides the opportunity to increase or decrease the number of weights 38 disposed within the device 30. In a further alternative, the weight(s) can have any known shape and/or configuration.

FIGS. 4A-4E depict top views of various different self-capacitance device 60 embodiments with different numbers and/or configurations of contacts 62. The different possible arrangements or disposition of the contacts 62 on the bottom of the device 60 allow for custom software to operate in conjunction with a touchscreen (not shown) to recognize several different unique objects placed on the touchscreen simultaneously, as well as their relative position and rotation on the screen's surface. That is, the different contact configurations as shown (and any other of a countless number of configurations of contacts) allow for each separate device with a unique configuration to be distinguished from the other devices with different configurations.

Figure 5A:
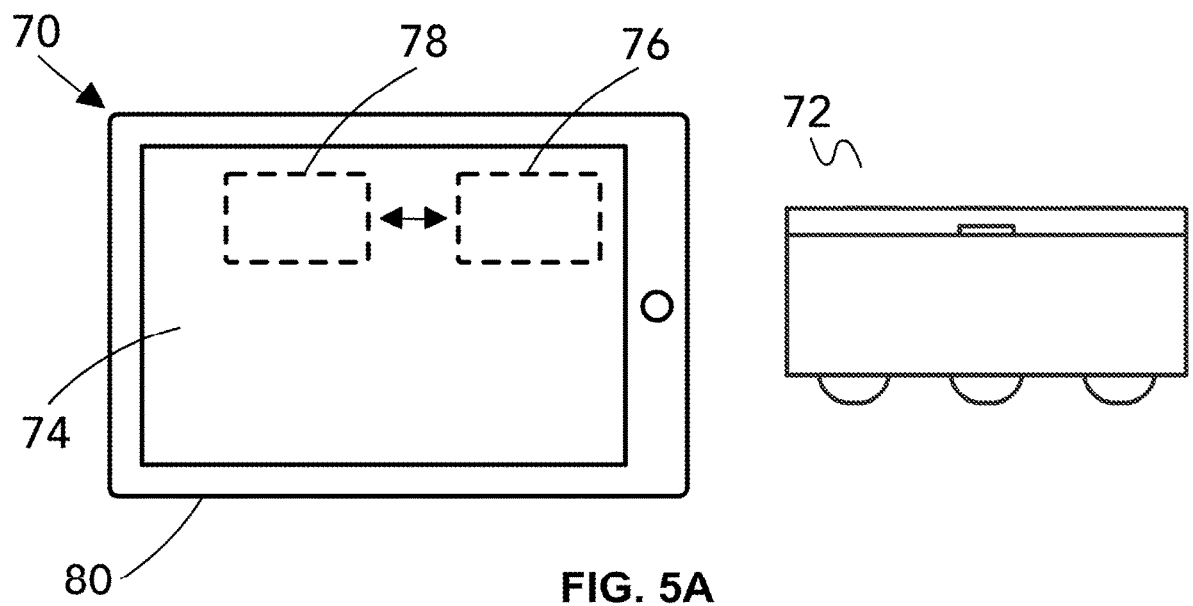
FIG. 5A depicts a system having a self-capacitance device and a known tablet, according to one embodiment.
Figure 5B:
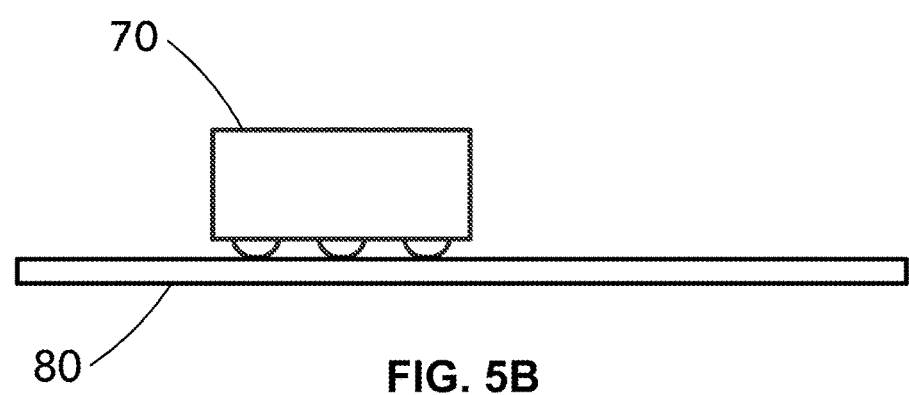
FIG. 5B depicts the system of FIG. 5A in which the self-capacitance device is placed into contact with the touchscreen of the tablet, according to one embodiment.

The various self-capacitance device and system embodiments disclosed or contemplated herein have several practical uses. As depicted in FIGS. 5A and 5B, one such system 70 includes an exemplary self-capacitance device 72 (which can be equivalent to any device embodiment herein) and any known tablet 80 or other type of known computing device (such as a laptop, mobile phone, etc.) having a touchscreen 74. As best shown in FIG. 5B, the device 72 can be placed into contact with the touchscreen on the tablet 80 as discussed elsewhere herein. In this embodiment, as best shown in FIG. 5A, the tablet 80 (or other computing device) has a processor 76 and a software component (such as, for example, a modular software component) 78 that is configured to operate in conjunction with the self-capacitance device 72 to allow for the device 72 and the tablet 80 to interact as described herein such that the touchpad 74 recognizes and can identify the device 72 when it is placed into contact therewith.

For example, the device 72 can be used as a game piece for a digital game in which the device 72 is used to interact with the digital game board displayed on the touchscreen 74 by being placed into contact with the touchscreen 74 and/or moved around while in contact with the touchscreen 74 as shown in FIG. 5B. In this example, the game software in the software component 78 would recognize and track the self-capacitance game piece (or pieces) 72 as described above. In certain alternative embodiments, an object (not shown), such as, but not limited to, an image, words, or a 3-D object, for example, may be affixed, magnetically attached to, or otherwise disposed on the top of the device 72 according to an embodiment herein. When the combined object (the self-capacitance device 72 and the attached object) is placed in contact with the touchscreen 74, the appropriate software 78 could operate with the processor 76 to display information related to that specific object. Designs may be included on the lid of the device 72, or the device 72 may be contained within another larger object.

Figure 6A:
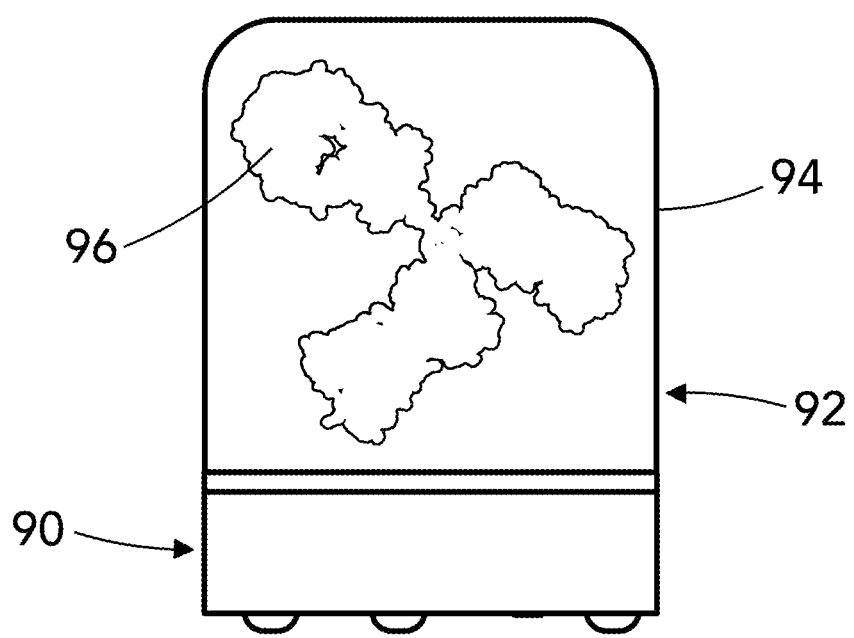
FIG. 6A is a side view of a self-capacitance device with an object disposed thereon, according to one embodiment.
Figure 6B:
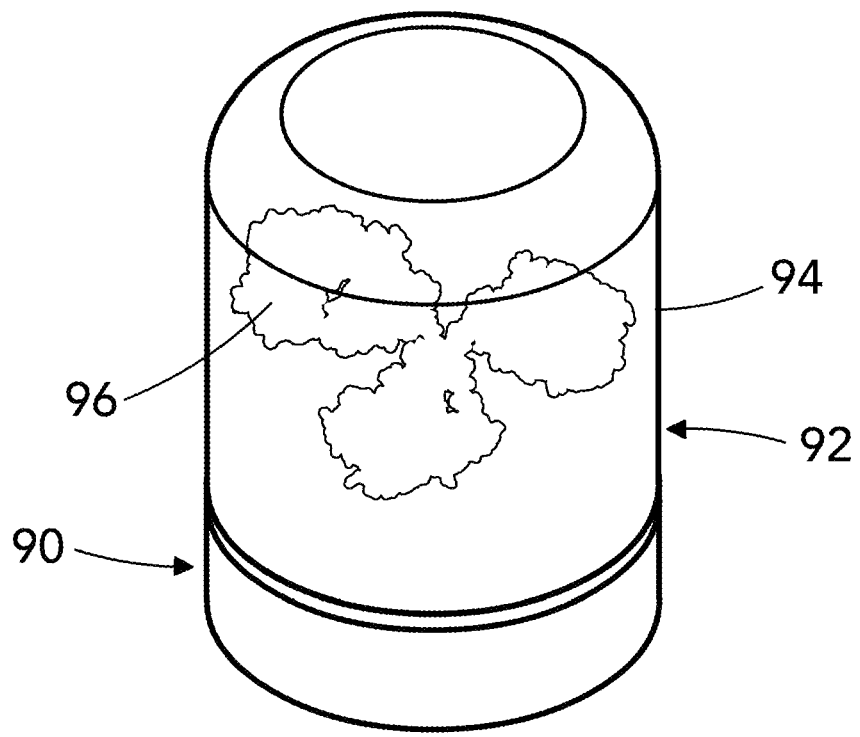
FIG. 6B is a perspective view of the self-capacitance device of FIG. 6A, according to one embodiment.

One exemplary embodiment of a device 90 with an object 92 disposed thereon is depicted in FIGS. 6A and 6B. In this implementation, the object 92 is a clear resin encasement 94 with a three-dimensional ("3-D") object 96 encased within the encasement 94 as shown. In one embodiment, the 3-D object 96 visible within the encasement 94 can be a figure or other object such as a toy or vehicle or any other type of object that would be disposed on the device 90 for purposes of use with a touchscreen 74 according to any of the embodiments disclosed or contemplated herein. In various alternative embodiments, the object (in this case, a 3-D object 96) can be attached directly to the device 90 without an encasement. In further implementations, any type of known encasement or enclosure or other similar structure can be provided, with the object 96 disposed therein. It is understood that any object or structure of any kind can be attached to any device embodiment disclosed or contemplated herein.

Although the various embodiments have been described with reference to preferred implementations, persons skilled in the art will recognize that changes may be made in form and detail without departing from the spirit and scope thereof.

What is claimed is:

1. A self-capacitance device comprising:
(a) a body;
(b) a capacitance coil disposed within the body; and
(c) at least three contacts disposed on a distal side of the body, wherein the at least three contacts are in electrical contact with the capacitance coil,
wherein the device is detectable by a touchscreen without human contact as a result of the capacitance coil when the at least three contacts are positioned in contact with the touchscreen.

2. The self-capacitance device of claim 1, wherein the electrical contacts between the capacitance coil and the at least three contacts are the only electrical connections with the capacitance coil.

3. The self-capacitance device of claim 2, wherein the body comprises:
(a) an internal wall disposed within the body;
(b) an external wall defining an outer surface of the body;
(c) a first space defined within the internal wall; and
(d) a second space defined between the internal wall and the external wall.

4. The self-capacitance device of claim 3, wherein at least one weight is positionable within the first space and the capacitance coil is disposed within the second space.

5. The self-capacitance device of claim 2, further comprising at least three attachment and connection mechanisms, wherein each of the at least three attachment and connection mechanisms fixedly attaches one of the at least three contacts to the body and provides the electrical connection between the corresponding contact and the capacitance coil.

6. The self-capacitance device of claim 5, wherein each of the at least three attachment and connection mechanisms comprises an elongated, threaded member in physical contact with the capacitance coil.

7. The self-capacitance device of claim 1, wherein the device is configured to be free-standing upon the touchscreen with the at least three contacts positioned in contact with the touchscreen.

8. The self-capacitance device of claim 7, wherein the electrical contacts between the capacitance coil and the at least three contacts are the only electrical connections with the capacitance coil.

9. The self-capacitance device of claim 8, further comprising:
(a) an opening defined in a proximal side of the body;
(b) a cover removably coupleable with the body at the opening; and
(c) a weight disposed within a first space within the body, wherein the capacitance coil is disposed within a second space within the body.

10. An object identification system for use with a touchscreen device, the system comprising:
(a) at least two self-capacitance devices, wherein each self-capacitance device comprises:
(i) a body;
(ii) a capacitance coil disposed within the body; and
(iii) at least three contacts disposed in a predetermined pattern on a distal side of the body such that the predetermined pattern is associated with the self-capacitance device, wherein the at least three contacts are in electrical contact with the capacitance coil,
wherein each of the at least two devices is separately detectable by a touchscreen without human contact as a result of the capacitance coil when the at least three contacts are positioned in contact with the touchscreen, and
wherein each of the at least two devices is configured to be free-standing upon the touchscreen with the at least three contacts positioned in contact with the touchscreen; and
(b) a software application configured to recognize each predetermined pattern of the at least three contacts on each of the at least two self-capacitance devices.

11. The object identification system of claim 10, wherein the software application is stored on a transportable memory device.

12. The object identification system of claim 11, wherein the system further comprises retail system packaging, wherein the at least two self-capacitance devices and the transportable memory device are disposed within the retail system packaging.

13. The object identification system of claim 10, wherein the system further comprises retail system packaging, wherein the retail system packaging comprises the at least two self-capacitance devices and instructions for downloading the software application.

14. The object identification system of claim 10, wherein the body comprises at least one weight disposed within the body.

15. The object identification system of claim 10, wherein the electrical contacts between the capacitance coil and the at least three contacts are the only electrical connections with the capacitance coil.

16. The object identification system of claim 10, further comprising a removable cover removably disposable on a proximal side of the body.

17. The object identification system of claim 16, further comprising an object disposed on the removable cover.

18. The object identification system of claim 17, wherein the object comprises:
    (a) an enclosure attached to the removable cover; and
    (b) a three-dimensional object disposed within the enclosure.

19. A self-capacitance device comprising:
    (a) a device body;
    (b) an object disposed on a first side of the body;
    (c) an unpowered capacitance structure disposed within the body; and
    (d) at least three contacts disposed on a second side of the body,
    wherein the at least three contacts are in electrical contact with the capacitance structure; and
    wherein the device is configured to be free-standing upon the touchscreen with the at least three contacts positioned in contact with the touchscreen.

20. The self-capacitance device of claim 19, wherein the object comprises:
    (a) an enclosure attached to the first side of the body; and
    (b) a three-dimensional object disposed within the enclosure.

* * * * *